Feb. 22, 1966  F. KÖNIG  3,237,036
COMMUTATING DYNAMO-ELECTRIC MACHINE
Filed April 4, 1963  4 Sheets-Sheet 1

Inventor:
FERDINAND KÖNIG
BY
Pennie Edmonds Morton,
Taylor and Adams
ATTORNEYS

Inventor:
FERDINAND KÖNIG

Feb. 22, 1966 F. KÖNIG 3,237,036
COMMUTATING DYNAMO-ELECTRIC MACHINE
Filed April 4, 1963 4 Sheets-Sheet 4

Inventor:
FERDINAND KÖNIG
BY
Pennie Edmonds Morton,
Taylor and Adams
ATTORNEYS

United States Patent Office 3,237,036
Patented Feb. 22, 1966

3,237,036
COMMUTATING DYNAMO-ELECTRIC MACHINE
Ferdinand König, Winterthur, Switzerland, assignor to Sulzer Brothers Limited, Winterthur, Switzerland, a company of Switzerland
Filed Apr. 4, 1963, Ser. No. 270,700
Claims priority, application Switzerland, Apr. 4, 1962, 4,068/62
5 Claims. (Cl. 310—266)

The invention pertains to an electric commutator machine in which the current-carrying rotor moves in an air gap between two portions of the stator, this gap being traversed by a magnetic field. The invention finds application not only in motors as hereinafter described but also in generators, in torque amplifiers and in rotary converters.

Electric motors employed for the operation of valves and similar devices must fulfill two requirements in particular. Because of the sudden deceleration or braking at the end of valve movement, it is necessary on the one hand that the moment of inertia of the rotating parts be as small as possible. In addition, such motors are required to withstand full current when stalled even for relatively long periods. Consequently motors responsive to these requirements have hitherto been available only at relatively low power ratings.

Thus for example there are known motors in which the rotor winding takes the form of a printed circuit disposed on a thin plate of insulating material, for example of synthetic plastic, the conductor elements of the circuit being applied to one or both surfaces of the plate. In this connection a construction is known in which the rotor is constructed to function as a magnetic conductor, in order to hold as small as possible the air gaps in the magnetic circuit. Since the current conducting cross-section is small in such motors, their power output is low. Particularly for the application or end use above-mentioned in which the rotor must deliver a certain torque even when stalled, in order to counterbalance the mechanical stresses applied to the valve, it is important to increase the rated output of such motors, recognizing the fact that this output is determined by the maximum temperature rise tolerable in the motor, which in turn is determined by the heating due to electrical losses. It may be mentioned here that with the rotor stalled, the cooling effect operating when the rotor turns is of course lost, so that the possibility of employing conventional motors for the particular purpose in view is very limited.

An object of the invention resides in the provision of a rotor with minimum possible losses and in which the conducting cross-section for the armature current is relatively large by comparison with that of previously known servomotors, in order to reduce the electrical resistance and consequently to raise the nominal rating of the motor.

According to the invention, the rotor is made up of laminar magnetic conductors whose surfaces are disposed substantially parallel to the direction of the magnetic field lines, with laminar electric conductors disposed between the magnetic conductors, the electric conductors having their surfaces oriented in the same direction.

In this manner, and in contrast to constructions heretofore in which the electric conductors comprise iron alloys and in which the purely magnetically conductive portions are made up of ferrite inserts in plastics, the electric conductors may according to the invention be composed of a material having good electrical conductivity such as copper. In this way the electric resistance and consequently the temperature rise are both reduced. Moreover by the employment of laminar magnetic elements, the structure required for the achievement of a specified field strength is substantially reduced, by comparison with known motors in which the rotors are made exclusively of non-magnetic material. Other advantages flow from the laminar construction of the rotor in the motor of the invention. By making up the magnetically conducting material in laminar form, magnetic short-circuiting in the rotor is prevented. Thus the magnetic lines pass entirely through the rotor and are closed on themselves only in the exterior passive stator portion of the motor. In contrast, in rotors made of magnetic material in the mass, a fraction of the lines of force are closed within the rotor itself so that a winding on the surface of the rotor facing the stator does not cut the entire magnetic field. The elimination of magnetic short-circuits in the rotor has the further consequence that in the commutation zones i.e., in the vicinity of the brushes, the self-induction upon short-circuit of winding portions through the brushes is held to relatively low values. This reduces burning of the brushes and improves the commutating properties of the motor.

The commutating properties of the motor may be further improved by holding to a minimum the self-induction of the winding. This can be achieved by providing that the magnetic field which is produced by the current flowing in a winding upon short-circuit at a brush flows with its lines of force so far as possible in air. In this way the coefficient of self-induction and the short-circuit voltage induced in consequence thereof in the winding are held to minimum values. It is therefore advantageous to shape the stator so as to provide, about the axis of rotor rotation, periodically located lengthenings of the air gap and to mount the brushes at such positions in the stator that the rotor conductors instantaneously undergoing commutation are, during such commutation, located in such lengthenings or continuations of the air gap.

In a preferred embodiment of the invention the rotor may take the form of a disk in which the lamellae of the electric conductors extend substantially in radial directions whereas the magnetic and/or electric conductors may be substantially wedge-shaped. In order to minimize eddy current losses the magnetic conductors may be made of individual thin sheets or of a plastic impregnated with ferrite material, cast or otherwise fabricated to laminar or wedge-shape. In addition the electric conductors of the rotor include extensions which constitute collectors or end terminals.

The rotors according to the invention may be employed in direct current, alternating current, or polyphase machines. They can be constructed in any shape, and preferably of cylindrical, disk, or wedge-shape.

The invention will now be further described with reference to the accompanying drawings in which.

Figure 1:
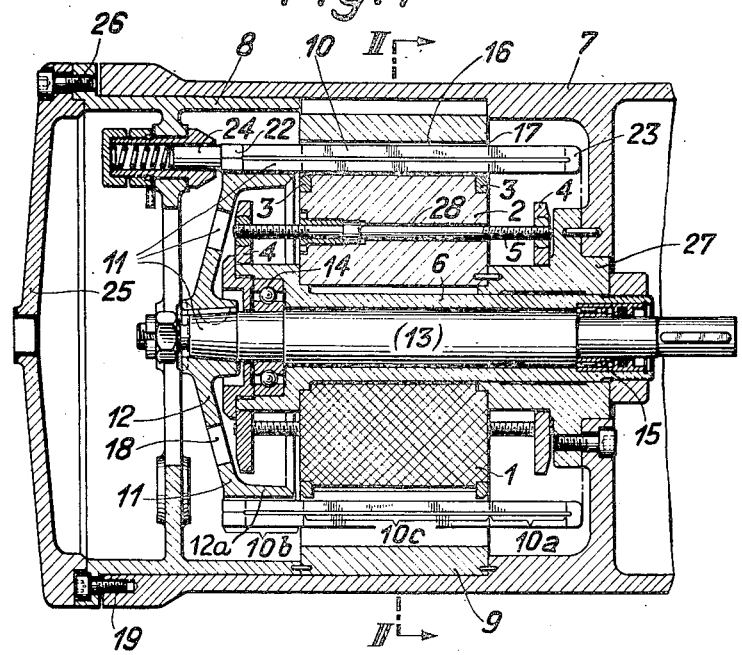
FIG. 1 shows a section taken on the section line 1—1 of FIG. 2, illustrating a first embodiment of the invention in the form of a direct current commutator machine.
Figure 2:
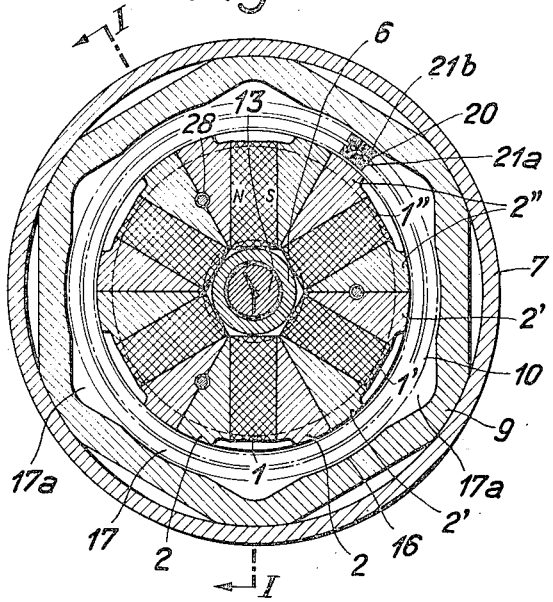
FIG. 2 is a sectional view taken on the line 2—2 of FIG. 1.
Figure 4:
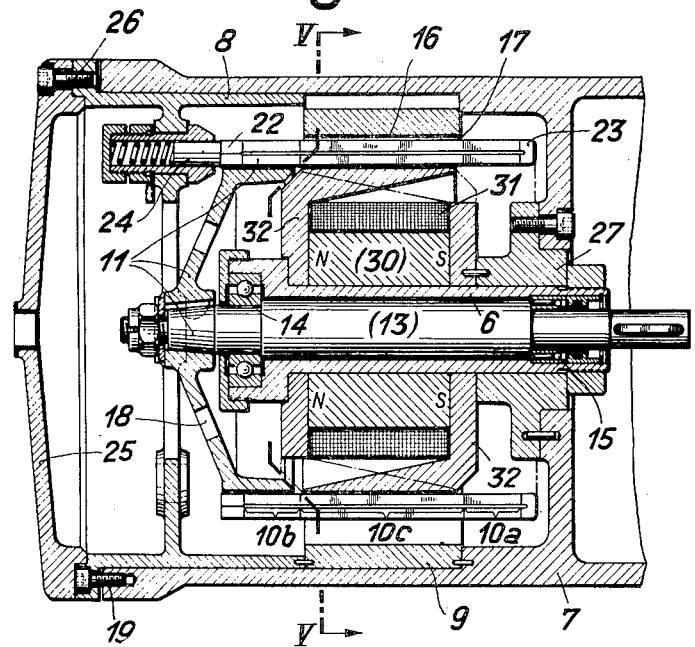
Figure 5:
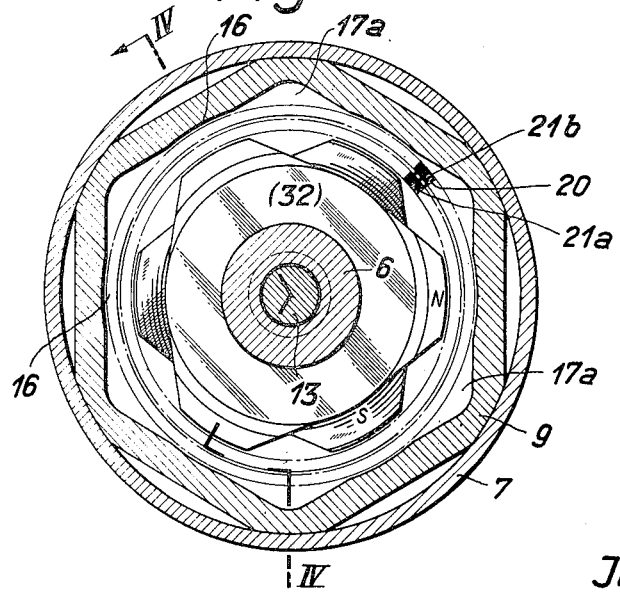
Figure 6:
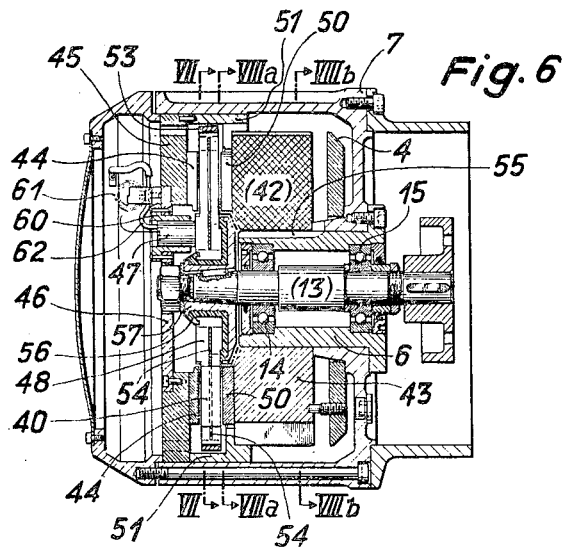
Figures 7, 9:
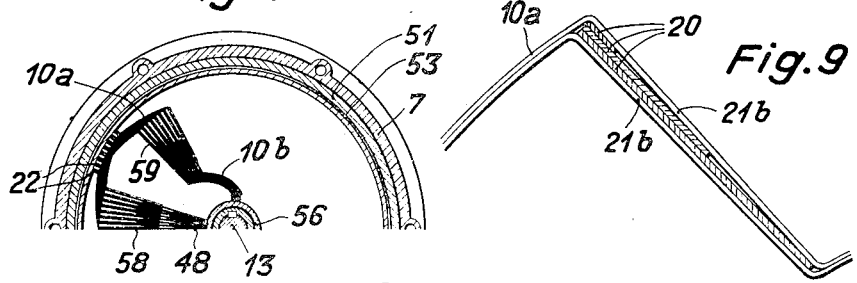
Figures 8A, 8B:
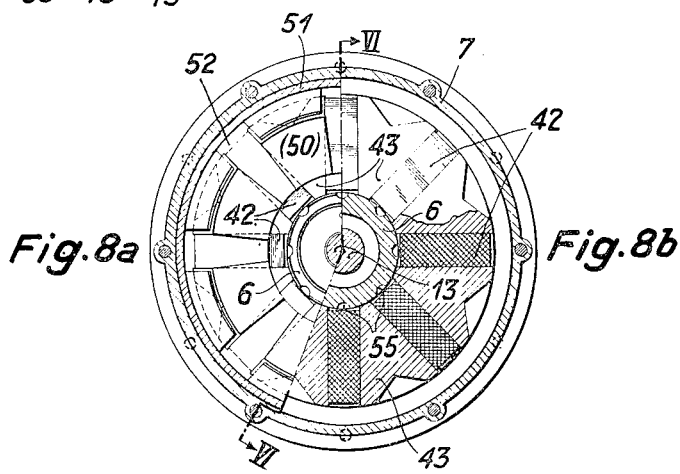

FIGS. 4 and 5 show a second embodiment of the servomotor of the invention, the relation of these two figures to each other being that of FIGS. 1 and 2, with FIG. 4 constituting a section on line 4—4 of FIG. 5 and FIG. 5 a section line 5—5 of FIG. 4;

FIGS. 6, 7 and 8 illustrate a further embodiment of the invention in which the rotor is of disk shape. FIG. 6 is a section taken on the line 6—6 of FIG. 8a. FIG. 7 is a section taken along the lines 7—7 of FIG. 6, while FIGS. 8a and 8b are sections taken along the lines 8a–8a and 8b–8b of FIG. 6 respectively; and FIG. 9 is a detail of FIG. 7 representing the radial portion of the rotor winding with wedge-shaped magnetic conductors disposed between two electrical conductors.

Referring to FIGS. 1 and 2, the magnetic field of the motor of these figures is generated by permanent magnets 1, 1', and 1" etc. with which are associated pole shoes 2, 2', 2" etc. Six such permanent magnets are shown in FIG. 2. These elements of structure are united into a star-shaped assembly held together by straps or rings 3. The permanent magnets are made in substantially rectangular parallelepiped form, magnetized along their least principal axis as indicated in FIG. 2 by the notation N–S applied to one of them. The radially inner stator portion comprising the elements just described is supported on a hollow stem or casing 6 which is stationarily fastened into the housing 7 by means of an insert 27 threaded into the housing. The outer stator portion 9 is fixed in the housing 7 by means of the ring 8 which in its turn is fastened to the housing 7 by means of screws 19. The stator portion 9 may be made of soft iron with cylindrical surfaces 16 of rotation (FIG. 2) formed thereon to perform the function of pole shoes. A cover 25 fastened with screws 26 to the ring 8 (FIG. 1) forms the end of the housing 7.

In the cylindrical slot 17 between the inner stator portion 1, 2 and the outer stator portion 9 is disposed the magnetically and electrically active portion 10 of the rotor 11, this portion 10 being made up of magnetic and electric conductors. The magnetic conductors thereof extend axially only over the range indicated at 10c, which lies within the magnetic field developed by the stator. The rotor 11 includes in addition to the portion 10 a plate or spider 12 and a shaft 13, the plate 12 being supported upon a conical portion of the shaft and affixed thereto with a nut. The portion 10 is affixed to the cylindrical axial extension 12a of the plate 12, and includes no magnetic material in the axial extremities 10a and 10b thereof. The shaft 13 is carried on bearings 14 and 15 which are disposed in the housing 7, and more particularly in the stem 6 thereof.

Figure 3:
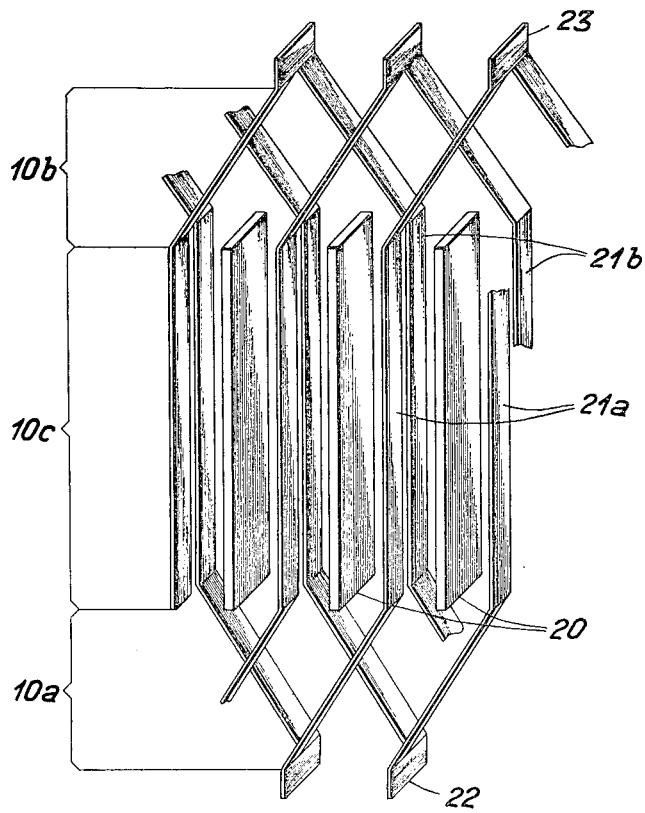
FIG. 3 is a fragmentary development into a plane of the rotor according to the invention, the individual lamellae being shown in perspective and spatially separated one from another.

The magnetic and electric conductors of the rotor portion 10 are illustrated in developed form in FIG. 3. The radially and axially extending magnetic conductors are shown at 20 and the interposed electric conductors are shown at 21a and 21b. These electric conductors are connected electrically to each other at the spool or winding ends 22 and 23. The individual conductors are mutually insulated for electrical and mechanical stresses by means of synthetic resin or lacquered filler materials. The rotor so built up constitutes a stable self-supporting structure which can if desired be further strengthened by means of fiber glass tapes.

As may be seen from FIG. 1, the winding ends 22 are formed together into a commutator on which ride the brushes 24. The support of the brushes is provided by ring 8 and is so constructed, in known fashion, that the brushes 24 are resiliently pressed against the winding ends 22. The current leads to the brushes 24, which may be conventional, are not shown.

As is shown in FIG. 2, circumferentially on either side of each pair of juxtaposed stator pole shoes comprising an outer pole shoe 16 and an inner pole shoe formed by adjacent elements 2 and 2', the cylindrical air gap 17 occupied by the rotor is lengthened as indicated at 17a outside the rotor and at 17b inside the rotor. The brushes 24 are so distributed about the axis of the machine that the conductors undergoing commutation thereat are themselves, at the instant of commutation, at the circumferential position of the extended air gaps 17a, 17b. In this way the commutating properties of the motor are improved since the relatively large air path and the relatively short ferromagnetic path of the gaps 17a, 17b present a large magnetic resistance to the magnetic field developed by short-circuit of the conducting lamellae 10 undergoing commutation at the brushes 24. Consequently, the self-induction coefficient and the resulting induced short-circuit voltage are held to low values.

In assembly, the magnets 1, 1', 1" etc. are first short-circuited together peripherally, and then at the axial ends thereof by means of iron rings 4, which are brought to bear against the axial ends of the magnets during such assembly. After the two halves of the stator (i.e. the inner and outer portions thereof which define the roughly cylindrical air gap 17 between them) have been assembled together with the rotor, the rings 4 are backed off from the magnets, by rotation of rods 5 which pass through openings 28 (FIG. 2) in the inner stator structure parallel to the axis of machine rotation. The rods 5 carry oppositely-handed threads on their two ends which engage female threads in the rings 4, and access for imparting such rotation to the rods 5 is had through openings 18 in the spider 12. The magnetic fields produced by the magnets then flow from poles of one polarity on the magnets, through the inner stator pole shoes 2, 2', 2" etc. across the air gap 17 via the magnetic lamellae 20 of the rotor to the pole shoes 16 of the outer stator structure, and back across the air gap via lamellae 20 to the inner stator pole shoes 2, 2', 2" etc. and to poles of the opposite polarity on magnets 1, 1', 1" etc. The motor is thus made ready for operation.

FIGS. 4 and 5 illustrate a similar motor in which the active stator (i.e. that including the sources of magnetomotive force) has been constructed in a different manner. It comprises a tubular core 30 of soft iron which can be magnetized by means of a field winding 31. The current leads to the winding 31 may be conventional and have therefore not been shown in the drawing. At each axial end of the core 30 there is provided a three-armed pole shoe element 32 (FIG. 5), the poles thereof extending axially outside the core 30 as is indicated in FIG. 4. The two elements 32 are circumferentially staggered so that north and south magnetized poles alternate at the periphery of the inner stator portion. In FIG. 5, 17a identifies again the elongations of the air gap outside the rotor which were described in connection with the embodiment of FIGS. 1 to 3, at spaces between poles on the two members 32.

In a further embodiment of the invention illustrated in FIGS. 6 to 9 the rotor possesses the form of a circular plate or disk rather than that of a cylinder as in the embodiments previously described. The magnetic field is created in this embodiment by permanent magnets 42 which may possess conventional shape and form similar to that of the magnets in FIG. 1. See FIG. 8b. Between the magnets 42 there are disposed pole shoe elements 43 for concentration of the magnetic field in the air gap in which the disk-shaped rotor 40 is to rotate. To this end, the elements 43 have attached thereto, at the axial ends thereof adjacent the rotor, end pieces 50 having the shape of circular sectors. The permanent magnets 42 and pole shoe elements 43 are held together by means of a ring 51 which includes slots 52 for air cooling of the motor.

The "passive" stator portion comprises pole shoes 44 which in shape, size and position correspond to the end pieces 50, attached to the pole shoes 43. The magnetic lines of force from magnets 42 pass through elements 43, end pieces 50 through the rotor 40, through the pole shoes 44 and are closed in a plate 45 of soft iron.

To achieve a sufficient cooling by air circulation, slots 55 are provided in a housing 6.

The rotor 40 is held to a hub 57 via an insulating layer 56, this hub being supported on a conical portion of the shaft 13 and being fastened thereto by means of a nut. At the outer periphery of the rotor 40 the winding ends 22 of the rotor conductors are held in position by means of an electrically insulating band 53. The entire rotor is encapsulated in a resinous insulating material 54 in order to give mechanical stability thereto, FIG. 7 shows part of the electrical winding of the rotor of the embodiment of FIGS. 6 to 9. This winding is made up in a manner generally similar to the construction shown in FIG. 3. In the structure of FIG. 3 as embodied in the motor of FIGS. 1 and 2, the winding ends or tabs 22 and 23 which connect an electric conductor 21a in series with an electric conductor 21b are located at axially opposite ends of the rotor, with the conductors 21a radially near the rotor axis and the conductors 21b (of which one is circumferentially aligned with each conductor 21a) radially more distant from the rotor axis. In the embodiment of FIGS. 6 to 9 on the other hand, the conductors, both magnetic and electric, have their long dimension extending radially of the rotor axis, with the junctions or tabs corresponding to junction tabs 22 and 23 of FIG. 3 at the center and periphery of the rotor. In FIG. 7 therefore the series-connected electric conductors are alternately at one and the other axial end of the rotors, instead of alternately near to and distant from the rotor axis. In FIG. 7, reference character 58 denotes a plurality of the electric conductors at one axial end of the rotor—the end near the reader in FIG. 7, while reference character 59 denotes a plurality of the electric conductors which are at the opposite axial end of the rotor—the end remote from the reader in FIG. 7. Subject to the foregoing explanation of the differing relationships between FIG. 3 and FIG. 1 on the one hand and between FIG. 3 and FIG. 6 on the other hand, the conductors 58 and 59 of FIG. 7 may be considered to correspond to the conductors 21a and 21b respectively of FIG. 3.

In the embodiment of FIG. 9, the magnetic conductors of the rotor are disposed between circumferentially adjacent electrical conductors in the radially extending portion of those electric conductors. In FIG. 9, two such electric conductors are shown in magnified form at 21b. The magnetic conductors 20 are so composed of individual sheets that they fill up the wedge-shaped spaces between adjacent conductors such as 21b. The radially outer, and especially the radially inner ends of the electric conductors are formed into evolute paths as indicated at 10a and 10b in order to occupy as little space as possible.

The brush carrier 46 is fastened to the stationary plate 45, the brushes being supported in sleeves 60. The brushes are circumferentially disposed so that the conductors of the rotor undergoing commutation thereat are at the circumferential locations of widenings or "lengthenings" of the air gap between the two stator portions on opposite sides of the rotor. Such widenings are provided between adjacent ones of the end pieces 50 (FIG. 8a). The brushes are pressed axially by means of a spring 61 against the radially inner winding tabs or junctions 48 (FIG. 7). Reference character 62 identifies the electrical lead-in to the brushes 47.

It will thus be seen that the invention provides a commutating dynamo-electric machine including first and second stator members which define an air gap therebetween, which may be of generally cylindrical or disk shape. The stator includes a source of magnetomotive force (shown as a plurality of permanent magnets or an electromagnet in the examples which have been described) whose field traverses the stator members and the air gap between them.

The machine includes a rotor mounted for rotation in this air gap, and in preferred embodiments the stator members are shaped to cause the width of the air gap to vary in a cyclical manner about the location of the rotor axis. In this way, the current-carrying conductors of the rotor occupy at successive phases of rotor rotation portion of the air gap of greater and lesser widths, and the stator mounted brushes which engage the segments of the rotor commutator to which these rotor conductors are connected are preferably so disposed circumferentially of the rotor axis that the rotor conductors undergoing commutation are, during such commutation, located in "wide" portions of the air gap.

Further, the rotor includes not only electric current conductors but also magnetically permeable elements or magnetic flux conductors, and both electric and magnetic conductors are of essentially laminar shape, oriented parallel to the direction of flux across the air gap, and oriented radially of the rotor axis.

Various modifications may however be made in the structures shown and described herein without departing from the invention, the scope of which is set forth in the appended claims.

I claim:

1. A commutating dynamo-electric machine comprising two stator members having an air gap therebetween, a rotor supported for rotation in said air gap, said stator members being shaped to vary the spacing thereof across said air gap circumferentially of the axis of rotation of said rotor, a plurality of electric conductors in said rotor, a plurality of magnetic conductors in said rotor, commutator segments in said rotor connected to said electric conductors, and brushes supported in said stator for engagement with said segments, said brushes being disposed to engage segments whose electrically adjacent electric conductors are disposed at locations circumferential of the rotor axis where said air gap is of greater than minimum width.

2. A commutating dynamo-electric machine comprising a substantially disk-shaped rotor, first and second stator members disposed on opposite sides of said rotor to define an air gap of circumferentially varying length between said stator members, means to support said rotor for rotation in said air gap, separate pluralities of laminar magnetic and electric conductors in said rotor, said conductors having two dimensional extension with the longer dimension extending substantially radially of said rotor, said electric conductors being distributed circumferentially of the axis of said rotor with circumferentially spaced ones of said electric conductors connected in series successively at radially inner and outer portions of said rotor for radially opposite directions of current flow in electrically adjacent series-connected conductors, and a plurality of brushes supported in said stator for engagement with electric conductors disposed in long portions of said air gap.

3. A commutating dynamo-electric machine comprising an axial ferromagnetic stator member, an annular ferromagnetic stator member surrounding said axial member with clearance to define a generally cylindrical air gap therebetween, means to develop a magnetic field flowing in a closed circuit including said stator members and said air gap, said field flowing substantially radially across said air gap, a rotor of generally cylindrical shape mounted for rotation in said air gap, axially extending, electric conductors on said rotor distributed circumferentially thereof and connected in series for axially opposite directions of current in circumferentially adjacent series-connected conductors, a commutator on said rotor having segments connected to said conductors, said stator members having circumferential variations in the radius of the surfaces thereof bounding said air gap whereby the radial length of said air gap varies circumferentially of said rotor, and brushes mounted in one of said stator members to engage said commutator, said brushes being circumferentially positioned with respect to said rotor axis to engage commutator segments whose connected rotor conductors occupy radially long portions of said air gap.

4. A commutating dynamo-electric machine comprising two coaxial stator members forming a plurality of circumferentially placed pairs of magnetic poles, said stator members having an air gap therebetween of length varying cyclically around the axis of symmetry thereof, a rotor supported for rotation in said gap, a plurality of electric conductors in the rotor extending transversely of said gap and distributed around said axis, said conductors being connected into at least one circuit of series-connected conductors with opposite directions of current flow in electrically adjacent series-connected conductors, a plurality of commutator segments in said rotor, each of said segments being connected to the junction between two electrically adjacent series-connected ones of said conductors, and a plurality of brushes supported in said stator to engage those of said segments of which the conductors connected thereto occupy long portions of said air gap.

5. A commutating dynamo-electric machine comprising a substantially disc-shaped rotor, first and second stator members disposed on opposite sides of said rotor to form a plurality of circumferentially displaced pairs of magnetic poles, said stator members having an air gap therebetween of length varying cyclically about the axis of said disc, a plurality of electric conductors in the rotor extending substantially radially thereof, said conductors being connected into at least one series circuit in which electrically adjacent conductors are circumferentially spaced by the spacing or adjacent ones of said poles and carry current in radially opposite directions, a plurality of commutator segments in said rotor each connected to the junction of two electrically adjacent ones of said series-connected conductors, and a plurality of brushes supported in said stator, said brushes being positioned to engage segments of which the conductors whose junctions are connected to such segments are located in long portions of said gap.

References Cited by the Examiner

UNITED STATES PATENTS

| | | | |
|---|---|---|---|
| 2,159,768 | 5/1939 | Macmillan | 310—266 |
| 2,402,214 | 6/1946 | Suydam | 310—266 |
| 3,069,577 | 12/1962 | Lee | 310—266 |

ORIS L. RADER, *Primary Examiner.*

MILTON O. HIRSHFIELD, *Examiner.*